US009207606B2

(12) United States Patent
Shinohara

(10) Patent No.: US 9,207,606 B2
(45) Date of Patent: Dec. 8, 2015

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Eiji Shinohara, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/076,605

(22) Filed: Nov. 11, 2013

(65) Prior Publication Data

US 2014/0193169 A1 Jul. 10, 2014

(30) Foreign Application Priority Data

Jan. 8, 2013 (JP) ................................ 2013-001324

(51) Int. Cl.
*G03B 15/00* (2006.01)
*G03G 15/00* (2006.01)
*G03G 21/00* (2006.01)

(52) U.S. Cl.
CPC ................ *G03G 15/50* (2013.01); *G03G 21/00* (2013.01)

(58) Field of Classification Search
CPC .............. G03G 15/5016; G03G 15/50; G03G 15/5004; G03G 15/047
USPC .................... 399/81, 32, 75, 80, 88, 186, 187
See application file for complete search history.

(56) References Cited

U.S. PATENT DOCUMENTS

| | | | | |
|---|---|---|---|---|
| 5,781,822 | A * | 7/1998 | Nishiyama et al. | 399/1 |
| 2011/0262197 | A1* | 10/2011 | Imamiya et al. | 399/341 |
| 2011/0274445 | A1 | 11/2011 | Kabai | |
| 2011/0294052 | A1 | 12/2011 | Aoki et al. | |

FOREIGN PATENT DOCUMENTS

| | | |
|---|---|---|
| JP | 09-281864 | 10/1997 |
| JP | 11-249511 | 9/1999 |
| JP | 2007-127774 | 5/2007 |
| JP | 2010-133998 | 6/2010 |
| JP | 2010262205 | 11/2010 |
| JP | 2011-245860 | 12/2011 |

OTHER PUBLICATIONS

Office Action of Notification of Reasons for Rejection for Japanese Patent Application No. 2013-001324 Dated Jan. 6, 2015, 7 pages.
Japanese Office Action for Japanese Application No. 2013-001324 mailed on Jun. 30, 2015.

(Continued)

*Primary Examiner* — Rochelle-Ann J Blackman
(74) *Attorney, Agent, or Firm* — Amin, Turocy & Watson, LLP

(57) ABSTRACT

According to an embodiment, an image forming apparatus which has a function of performing an erasing process of erasing an image formed on a recording medium and an image forming process of forming an image on the recording medium is provided. The image forming apparatus automatically performs the erasing process when a state where an operation panel does not receive a process request from a user continues during a predetermined time or more.

9 Claims, 4 Drawing Sheets

(56) References Cited

OTHER PUBLICATIONS

Office Action of Decision of Final Refusal for Japanese Patent Application No. 2013-001324 dated Oct. 6, 2015, 3 pages.

Office Action of Decision of Dismissal of Amendment for Japanese Patent Application No. 2013-001324 dated Oct. 6, 2015, 8 pages.

* cited by examiner

IMAGE FORMING APPARATUS

CROSS-REFERENCE TO RELATED APPLICATION

This application is based upon and claims the benefit of priority from the prior Japanese Patent Application No. 2013-1324, filed on Jan. 8, 2013, the entire contents of which are incorporated herein by reference.

FIELD

Embodiments described herein relate generally to an image forming apparatus having a function of erasing an image formed on a recording medium.

BACKGROUND

As an image forming apparatus such as a multi function peripheral (MFP) which forms an image on a recording medium, for example, a sheet, an apparatus which can perform an image forming process using an erasable toner and an erasing process of an image formed on a sheet by an erasable toner has been developed. A user forms an image on a sheet using the image forming apparatus, and erases the image on the sheet by using the apparatus after using the sheet. According to this, it is possible to reuse the sheet many times, and it is possible to reduce an amount of used sheets.

In the image forming apparatus which enables the sheet to be reusable, the erasing process is performed manually by the user. Specifically, when the user operates an operation panel of the image forming apparatus to instruct the start of the erasing process, the image forming apparatus performs the erasing process. However, when the user thinks that he wants to perform the erasing process and when the image forming apparatus is performing another process, for example, a printing process, there is a problem in that the user has to wait until the printing process is ended.

DETAILED DESCRIPTION

According to an embodiment, an image forming apparatus having a function of performing an erasing process of erasing an image formed on a recording medium and an image forming process of forming an image on the recording medium is provided. The image forming apparatus includes an image forming unit, an erasing unit, an operation panel, and a control unit. The image forming unit forms an image on the recording medium. The erasing unit erases the image formed on the recording medium. The operation panel receives a process request including the image forming process performed by the image forming unit and the erasing process performed by the erasing unit. The control unit controls the units to perform a process corresponding to the process request received by the operation panel, and controls the erasing unit to perform the erasing process when a state where the operation panel does not receive the process request continues during a predetermined time or more.

Figure 1:
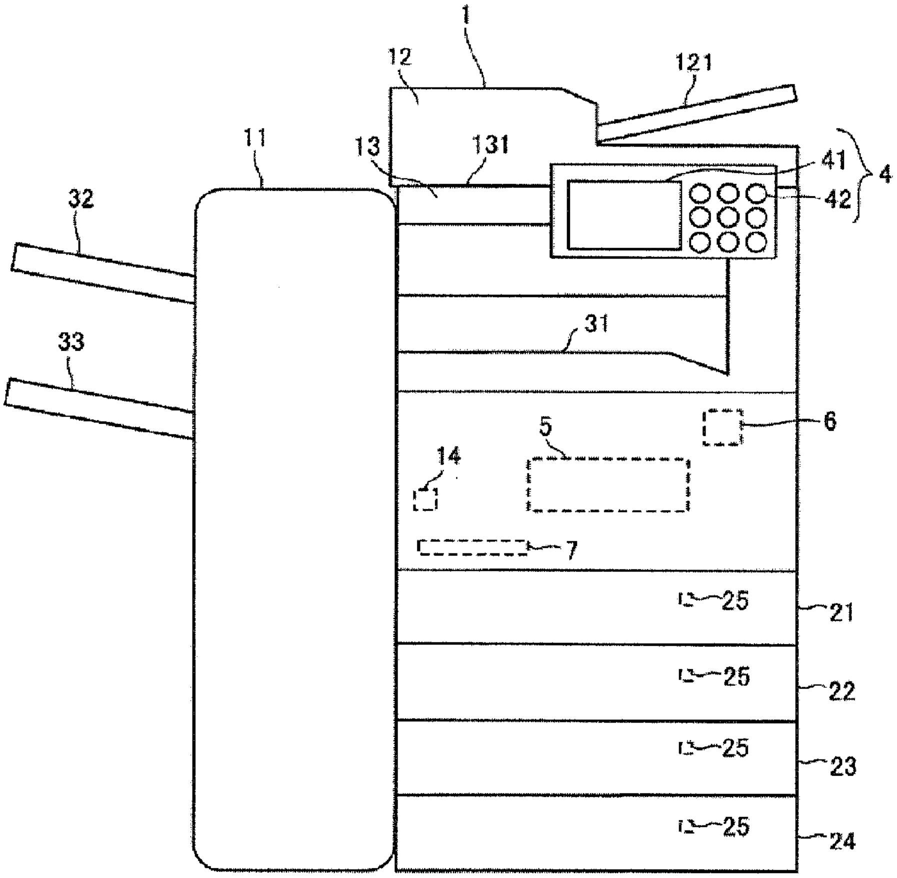
FIG. 1 is a diagram illustrating appearance of an image forming apparatus according to an embodiment.

Hereinafter, the embodiment will be further described with reference to the drawings. In the drawings, the same sign represents the same or similar portion. The embodiment will be described with reference to FIG. 1. FIG. 1 is a diagram illustrating appearance of an image forming apparatus 1 of the embodiment. The image forming apparatus 1 can perform a printing process of forming an image on a recording medium, for example, a sheet using an erasable color material, for example, a toner, and an erasing process of erasing the image of the sheet formed by an erasable toner. The erasable toner is a toner, color of which is erased, for example, by heat. The image forming apparatus 1 is an MFP, and can perform a scanner process, a FAX process or the like in addition to the processes described above. As illustrated in FIG. 1, the image forming apparatus 1 is connected to, for example, a finisher 11.

The image forming apparatus 1 includes an auto document feeder (ADF) 12, a scanner 13, a sheet feeding cassettes 21 to 24, an empty sensor 25, a sheet discharge tray 31, and an operation panel 4. In addition, the image forming apparatus 1 includes a communication unit 14, an image forming unit 5, a fixing unit 6 also serving as the erasing unit, and a control unit 7.

The ADF 12 sends a sheet placed in an ADF tray 121 to a reading position of the scanner 13. The scanner 13 reads the image of the sheet placed on a platen 131 or an image of the sheet transported to the reading position by the ADF tray 121. The communication unit 14 communicates with an external device on a network through wireless or wired connection.

The sheet feeding cassettes 21 to 24 accommodate sheets in a stacked state to supply a sheet of an image forming process target or a color erasing process target to the image forming unit 5 and the fixing unit 6. The sheet of the image forming process target is a sheet on which an image is not formed. The sheet of the color erasing process target is a sheet on which an image is formed using an erasable toner. The user accommodates the sheet of the color erasing process target, for example, in the sheet feeding cassette 21, and accommodates the sheet of the image forming process target, for example, in the sheet feeding cassettes 22 to 24.

The empty sensor 25 is provided corresponding to each of the sheet feeding cassettes 21 to 24. The empty sensor 25 detects whether a sheet is accommodated in each of the sheet feeding cassettes 21 to 24, and outputs a detection signal to the control unit 7. The sheet discharge tray 31 accommodates the sheets subjected to the image forming process or the erasing process in a stacked state in the image forming apparatus 1.

The operation panel 4 includes a touch-panel display unit 41 and an operation key 42. The display unit 41 displays setting information and an operation status of the image forming apparatus 1, log information, and a notice to a user. In addition, the display unit 41 receives designation of a condition for a function of the image forming apparatus 1 by a touch operation of the user, for example, designation of the sheet feeding cassette and the sheet discharge tray to be described later. The operation key 42 includes a start instruction button that receives a process request for the process function of the image forming apparatus 1 by an input operation of the user.

The finisher 11 includes FIN trays 32 and 33. The FIN trays 32 and 33 accommodate, in a stacked state, the sheets subjected to the image forming process or the erasing process discharged from the image forming apparatus 1. By operating the operation panel 4, the user may select any tray of the sheet discharge tray 31, the FIN trays 32 and 33, as a discharge destination of the sheet subjected to the image forming process or the erasing process. The image forming apparatus 1 discharges the sheet subjected to the image forming process or the color erasing process to the tray selected by the user.

The control unit 7 includes a processor, an application specific integrated circuit (ASIC), a memory, and a hard disk drive (HDD), and controls the whole of the image forming apparatus 1. The processor executes a program stored in the memory or the HDD to realize various functions of the image forming apparatus 1. The ASIC is a circuit only for realizing a specific function, and may play a role in a proper function realized by the processor.

Figure 2:
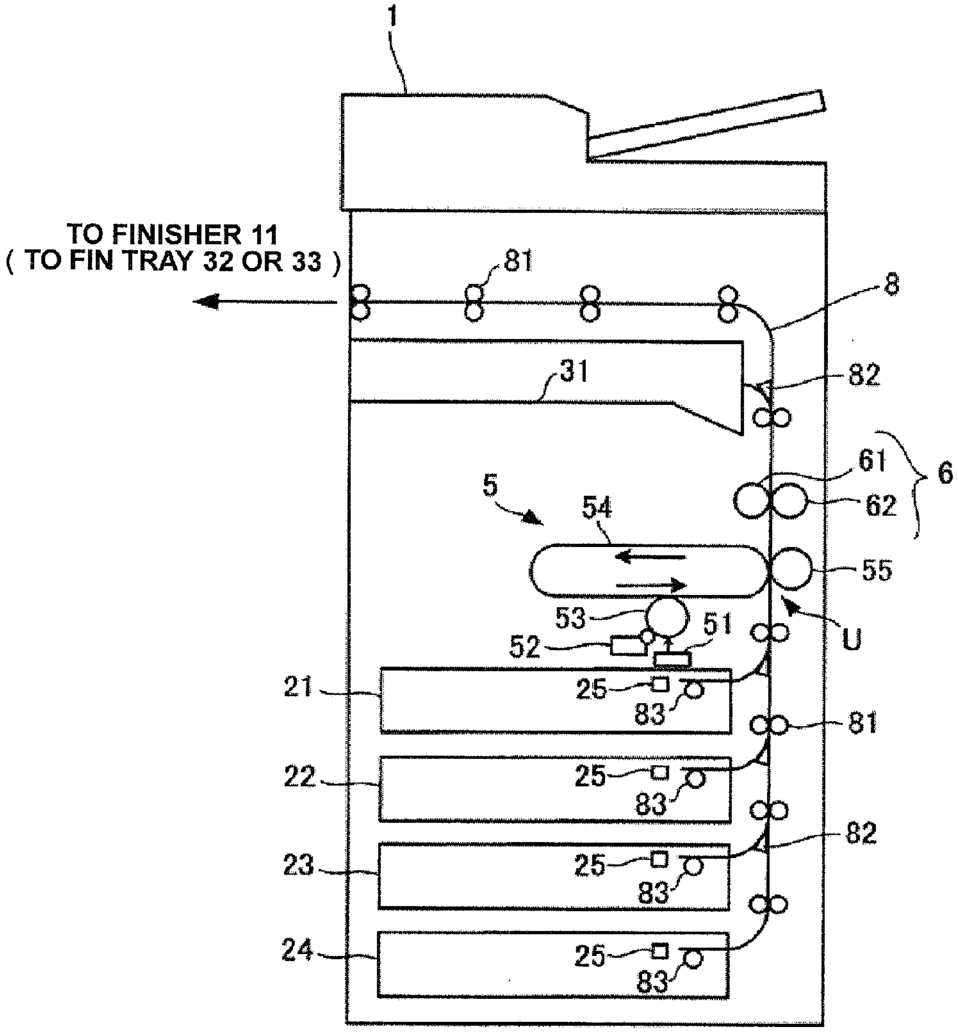
FIG. 2 is a cross-sectional view illustrating main units of the image forming apparatus according to the embodiment.

The image forming unit 5 and the fixing unit 6 also serving as the erasing unit will be described with reference to FIG. 2. FIG. 2 is a cross-sectional view illustrating main units of the image forming apparatus 1. The image forming unit 5 forms an image on a sheet of the image forming process target. As illustrated in FIG. 2, the image forming unit 5 includes a laser unit 51, a development unit 52, a photoreceptor 53 as an image bearing body, a transfer belt 54, and a transfer roller 55. The laser unit 51 performs exposure scanning on the photoreceptor 53 to form an electrostatic latent image on the photoreceptor 53, for example, based on data of an image read by the scanner 13.

The development unit 52 supplies an erasable toner to the photoreceptor 53 to develop an electrostatic latent image, and forms an image on the photoreceptor 53 by the erasable toner. Hereinafter, the image formed by the erasable toner may be merely referred to as a toner image. The erasable toner includes, for example, a coloring compound, a developer, and a decolorant. The coloring compound may be, for example, a Leuco dye which develops color in blue. The developer may be, for example, phenols. The decolorant may be, for example, a substance that is compatible with the coloring compound by heating and has no affinity to the developer. The erasable toner is colored by interaction between the coloring compound and the developer, and is decolored by disconnection of the interaction between the coloring compound and the developer by heating at equal to or higher than an erasing temperature.

An outer peripheral face of the photoreceptor 53 is formed of a photosensitive surface such as an organic photo conductor (OPC). The photoreceptor 53 bears the toner image on the photosensitive surface, and rotates clockwise in FIG. 2. The transfer belt 54 is provided in contact with the photoreceptor 53. The transfer belt 54 is supported in an endless-ring shape by a roller (not illustrated), and rotates counterclockwise in FIG. 2. The transfer belt 54 bears the toner image primarily transferred from the photoreceptor 53 and rotates, thereby transporting the toner image to a position opposed to the transfer roller 55. Hereinafter, the position where the transfer belt 54 is opposed to the transfer roller 55 is referred to as a secondary transfer position U. The transfer roller 55 comes in contact with the transfer belt 54 at the secondary transfer position U, and transports the sheet transported from the sheet feeding cassettes 21 to 24 with the sheet interposed with the transfer belt 54.

The image forming apparatus 1 has a transport path 8 reaching to the sheet discharge tray 31 or the finisher 11 through the sheet feeding cassettes 21 to 24, the secondary transfer position U, and the fixing unit 6. The image forming apparatus 1 includes a transport unit that is formed of a pickup roller 83, a transport roller 81, flappers 821 and 822, and the like to transport the sheet along the transport path 8. The pickup roller 83 is provided in each of the sheet feeding cassettes 21 to 24, and takes the sheet out of each of the sheet feeding cassettes 21 to 24. The flapper 821 guides the sheet taken out of the sheet feeding cassettes 21 to 24 to the transport path 8. The transport roller 81 is provided along the transport path 8, and transports the sheet taken out of the sheet feeding cassettes 21 to 24 in a direction of the secondary transfer position U. The flapper 822 distributes the sheet passing through the fixing unit 6 to the sheet discharge tray 31 or the finisher 11.

When the image forming process is performed, the transport unit of the image forming apparatus 1 takes the sheet out of the sheet feeding cassettes 21 to 24 accommodating the sheet of the image forming process target, and transports the taken-out sheet to the secondary transfer position U. When the image forming process is performed, the transfer belt 54 and the transfer roller 55 transfer the toner image onto the sheet in cooperation.

The fixing unit 6 is formed of a heating unit including a heating roller 61 and a pressure roller 62. The pressure roller 62 comes in contact with the heating roller 61, and transports the sheet interposed with the heating roller 61. Each of the heating roller 61 and the pressure roller 62 has a heater therein. When the image forming process is performed, a temperature control of the fixing unit 6 is performed such that a heating temperature is a fixing temperature, for example, 80° C. The fixing unit 6 heats and presses the sheet at the fixing temperature to fix the toner image to the sheet.

When the erasing process is performed, the transport unit of the image forming apparatus 1 takes the sheet out of the sheet feeding cassettes 21 to 24 accommodating the sheet of the erasing process target, and transports the sheet to the fixing unit 6 through the secondary transfer position U. When the erasing process is performed, the fixing unit 6 serves as the erasing unit. The fixing unit 6 heats and presses the sheet at an erasing temperature higher than the fixing temperature, for example, 90° C. to erase the toner image of the sheet. Specifically, the fixing unit 6 decolors the erasable toner forming the toner image of the sheet, thereby erasing the toner image. The transport unit of the image forming apparatus 1 discharges the sheet subjected to the image forming process or the erasing process to the sheet discharge tray 31 or the FIN trays 32 and 33.

Figure 3:
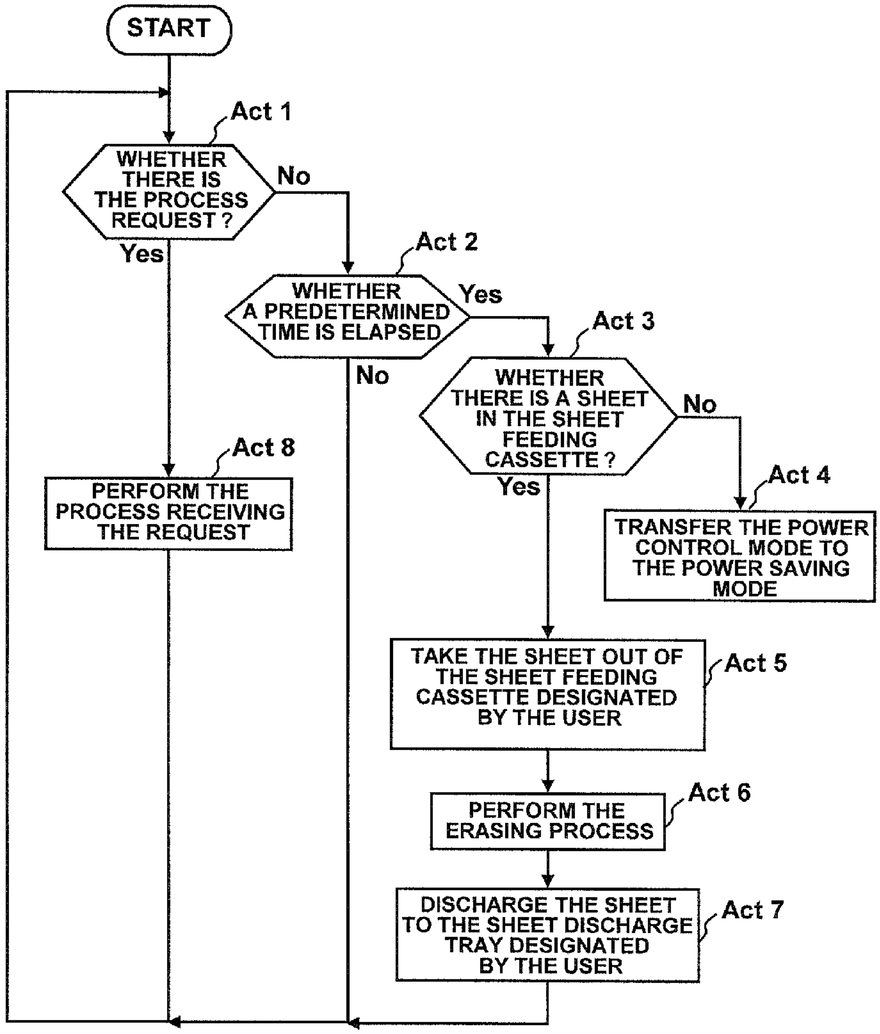
FIG. 3 is a flowchart illustrating an erasing process of the image forming apparatus according to the embodiment.

The image forming apparatus 1 has a function of a manual erasing process of starting the erasing process in response to reception of the process request from the user by the operation panel 4, and an automatic erasing process of automatically starting the erasing process even when there is no user instruction by the operation panel 4. Hereinafter, the automatic erasing process will be described with reference to FIG. 3. FIG. 3 is a flowchart illustrating the erasing process of the image forming apparatus 1.

When a resting state where there is no process request such as a scanner process, a FAX process, a printing process of forming an image, and a color erasing process during a predetermined time continues in the operation panel 4 of the image forming apparatus 1, the control unit 7 transfers the power control mode of the image forming apparatus 1 from the normal power mode to the power saving mode of reducing the power supply to the image forming unit 5 and the fixing unit 6. In addition, when there is a sheet of the erasing process target in the sheet feeding cassette designated by the user and when transferring to the power saving mode, the control unit 7 performs the automatic erasing process. As will be described later, the sheet feeding cassette designated by the user is a sheet feeding cassette designated by the user among the sheet feeding cassettes 21 to 24, as the sheet feeding source at the time of the erasing process.

As illustrated in FIG. 3, in Act 1, the control unit 7 determines whether there is the process request by the user such as the scanner process, the FAX process, and the printing process. Specifically, the control unit 7 determines whether the operation panel 4 receives any process request of the above processes. The user operates, for example, a start instruction button included in a keyboard 42, such that the operation panel 4 receives the process request. The control unit 7 determines that the operation panel 4 does not receive the process request (NO in Act 1), the operation of the image forming apparatus 1 proceeds to Act 2. In Act 2, the control unit 7 determines whether a predetermined time is elapsed, for example, based on the following timing result.

The control unit 7 starts timing, for example, after the process of the image forming apparatus 1 for the process request ends, and continues timing as long as there is the next new process request. When there is the next new process request, the control unit 7 clears the timing result, and newly starts timing again after the process of the image forming apparatus 1 for the new process request ends. The process request does not include the automatic erasing process.

The control unit 7 determines that the predetermined time is not elapsed (NO in Act 2), the operation of the image forming apparatus 1 returns to Act 1. When the control unit 7 determines that the predetermined time is elapsed (YES in Act 2), the operation of the image forming apparatus 1 proceeds to Act 3. In Act 3, the control unit determines whether there is a sheet of the erasing process target in the sheet feeding cassette designated by the user based on a detection signal from the empty sensor 25. When the control unit 7 determines that there is no sheet of the erasing process target in the sheet feeding cassette designated by the user (NO in Act 3), the operation of the image forming apparatus 1 proceeds to Act 4. In Act 4, the control unit 7 transfers the power control mode of the image forming apparatus 1 from the normal power mode to the power saving mode.

The normal power mode is a mode in which the control unit 7 performs a power control, giving priority to a response operation of the image forming apparatus 1 for the process request of the user. In the normal power mode, the control unit 7 performs the power control such that power necessary for the image forming apparatus 1 to immediately respond to the process request of the user is supplied to the image forming unit 5 and the fixing unit 6. The power saving mode is a mode in which the control unit 7 performs the power control, giving priority to power saving. In the power saving mode, the control unit 7 performs the power control to further reduce the power supply to the image forming unit 5 and the fixing unit 6 than the case of the normal power mode. The image forming apparatus 1 is controlled in the normal power mode by the control unit 7, in the resting state of Act 3, in other words, in a state of waiting for the process request from the user. In addition, when a state of waiting for the process request continues during a predetermined time or more and there is no sheet of the erasing process target in the sheet feeding cassette designated by the user, the image forming apparatus 1 is controlled in the power saving mode by the control unit 7.

In the power saving mode, the control unit 7 may perform the power control to reduce the power supply to any one unit of the image forming unit 5 and the fixing unit 6.

In Act 3, when the control unit 7 determines that there is the sheet of the erasing process target in the sheet feeding cassette designated by the user (YES in Act 3), the operation of the image forming apparatus 1 proceeds to Act 5. In Act 5 to Act 7, the control unit 7 controls the transport unit such as the pickup roller 83 and the flapper 821, and the fixing unit 6, to cause the image forming apparatus 1 to perform the automatic erasing process.

Figure 4:
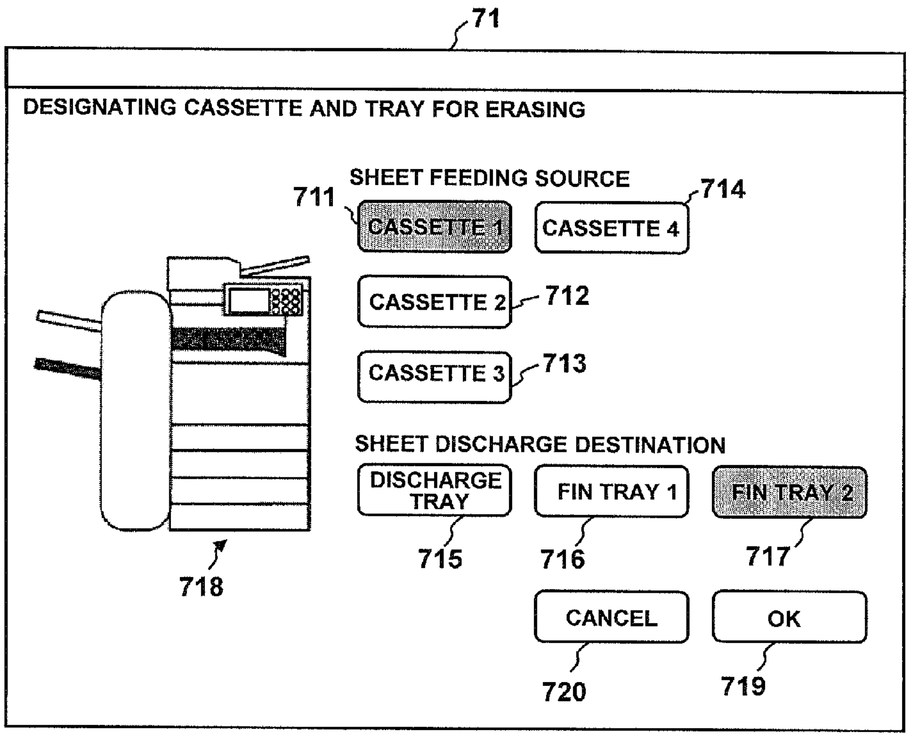
FIG. 4 is a setting screen of designating a sheet feeding source and a sheet discharge destination in a display unit of the image forming apparatus according to the embodiment.

FIG. 4 is a setting screen 71 for designating a sheet feeding source and a sheet discharge destination in the display unit 41 of the image forming apparatus 1. The user may set the sheet feeding cassette that is the sheet feeding source of the sheet and the sheet discharge tray that is the sheet discharge destination at the time of the manual erasing process and the automatic erasing process, using the operation panel 4. Specifically, when the operation panel 4 receives a display request of the setting screen 71 from the user, the control unit 7 displays the setting screen 71 on the display unit 41.

As illustrated in FIG. 4, the setting screen 71 includes sheet feeding source buttons 711 to 714 for designating the sheet feeding cassettes 21 to 24 as the sheet feeding sources, sheet discharge destination buttons 715 to 717 for designating the sheet discharge tray 31 or the FIN trays 32 and 33 as the sheet discharge destinations, an OK button 719, and a cancel button 720. The sheet feeding source buttons 711 to 714 are provided corresponding to the sheet feeding cassettes 21 to 24, respectively. The sheet feeding source buttons 711 to 714 receive designation of any sheet feeding cassette of the sheet feeding cassettes 21 to 24 as the sheet feeding source by a touch operation of the user. The sheet discharge destination buttons 715 to 717 are provided corresponding to the sheet discharge tray 31 or the FIN trays 32 and 33. The sheet discharge destination buttons 715 to 717 receive designation of any sheet discharge tray of the sheet discharge trays 31 to 33 as the sheet discharge destination by a touch operation of the user. In addition, the setting screen 71 displays an image 718 representing positions of the sheet feeding cassettes 21 to 24, the sheet discharge tray 31, and the FIN trays 32 and 33 corresponding to one of the sheet feeding source buttons 711 to 714 and of the sheet discharge destination buttons 715 to 717 operated by the user in the image forming apparatus 1. The OK button 719 receives determination of the sheet feeding cassette of the sheet feeding source and the sheet discharge tray of the sheet discharge destination designated by the sheet feeding source buttons 711 to 714 and the sheet discharge destination buttons 715 to 717 by a touch operation of the user. The cancel button 720 receives cancel of the designation of the sheet feeding cassette of the sheet feeding source and the sheet discharge tray of the sheet discharge destination by a touch operation of the user.

When the OK button 719 receives determination of the sheet feeding source and the sheet discharge destination, the control unit 7 confirms the sheet feeding cassette designated by the sheet feeding source buttons 711 to 714, as the sheet feeding cassette designated by the user in Act 5. In addition, the control unit 7 confirms the sheet discharge tray designated by the sheet discharge destination buttons 715 to 717, as the sheet discharge tray designated by the user in Act 7 to be described later. Accordingly, the user accommodates the sheets of the erasing process target in the desired sheet feeding cassettes 21 to 24, and may designate the sheet feeding cassettes 21 to 24 accommodating the sheets, as the sheet feeding cassette of the sheet feeding source at the time of the erasing process on the setting screen 71. In addition, the user may designate the desired sheet discharge trays on the setting screen 71 to correspond to the designated sheet feeding cassettes 21 to 24, by one-to-one. In addition, a default sheet feeding cassette and sheet discharge tray are predetermined as the sheet feeding source and the sheet discharge destination at the time of the erasing process. Accordingly, when the sheet feeding cassette of the sheet feeding source and the sheet discharge tray of the sheet discharge destination are not designated on the setting screen 71 by the user, the image forming apparatus 1 performs feeding of the sheet of the erasing process target and discharging of the sheet subjected to the erasing process, using the default sheet feeding cassette and sheet discharge tray.

The control unit 7 performs the automatic erasing process before transferring to the power saving mode, using the sheet feeding cassette and the sheet discharge tray designated by the user. Specifically, in Act 5, the control unit 7 operates the pickup roller 83 corresponding to the sheet feeding cassette designated by the user. The pickup roller 83 takes the sheet of the erasing process target on which the image is formed by the erasable toner, from the sheet feeding cassette designated by the user. In addition, in Act 6, the control unit 7 controls the heating temperature of the fixing unit 6 to the erasing temperature, and rotates the heating roller 61 and the pressure roller 62. The fixing unit 6 heats and presses the sheet of the erasing process target fed from the sheet feeding cassette designated by the user at the erasing temperature, thereby erasing the toner image of the sheet.

In addition, in Act 7, the control unit 7 discharges the sheet subjected to the erasing process from which the image is erased and which is reusable, to the sheet discharge tray of the sheet discharge destination designated by the user, by the transport unit such as the flapper 822. When the sheet discharge destination designated by the user is the sheet discharge tray 31, the transport unit controlled by the control unit 7 discharges the sheet to the sheet discharge tray 31. When the sheet discharge destination designated by the user is the FIN tray 32 or 33, the transport unit controlled by the control unit 7 transports the sheet to the finisher 11. In addition, the control unit 7 instructs the FIN tray 32 or 33 as the sheet discharge destination, to the finisher 11. The finisher 11 discharges the sheet to the instructed FIN tray 32 or 33.

After discharging the sheet subjected to the erasing process in Act 7, the operation of the image forming apparatus 1 returns to Act 1. In Act 1, when the control unit 7 determines that the operation panel 4 does not receive the process request (NO in Act 1), the operation of the image forming apparatus 1 returns to Act 2. In Act 2, since the timing result is not cleared, the control unit 7 determines that the predetermined time is elapsed (YES in Act 3). The operation of the image forming apparatus 1 returns to Act 3. In Act 3, when the control unit 7 determines that there is the sheet of the erasing process target in the sheet feeding cassette designated by the user (YES in Act 3), the operation of the image forming apparatus 1 returns to operation of the automatic erasing process of Act 5 to Act 7. In Act 3, when the control unit 7 determines that there is no sheet of the erasing process target in the sheet feeding cassette designated by the user (NO in Act 3), the operation of the image forming apparatus 1 proceeds to Act 4. In Act 4, as described above, the control unit 7 transfers the power control mode of the image forming apparatus 1 from the normal power mode to the power saving mode.

Accordingly, when the power control mode of the image forming apparatus 1 transfers from the normal power mode to the power saving mode and when there is the sheet of the erasing process target in the sheet feeding cassettes 21 to 24 designated by the user, the control unit 7 transfers the power control mode to the power saving mode after performing the erasing process for all the sheets in the sheet feeding cassette.

In addition, in Act 1, when the control unit 7 determines that the operation panel 4 receives the process request (YES in Act 1), the operation of the image forming apparatus 1 proceeds to Act 8. In Act 8, the control unit 7 clears the timing result. The control unit 7 controls constituent elements of the image forming apparatus 1 related to the process request received by the operation panel 4, to cause the image forming apparatus 1 to perform the process corresponding to the process request. For example, when the process request is a performance request of a normal erasing process, the control unit 7 controls the heating temperature of the fixing unit 6 to the erasing temperature, and rotates the heating roller 61 and the pressure roller 62. The fixing unit 6 heats and presses the sheet of the erasing process target fed from the sheet feeding cassette designated by the user at the erasing temperature, thereby erasing the toner image of the sheet. When the process of the image forming apparatus 1 corresponding to the process request ends, the control unit 7 newly starts timing. The operation of the image forming apparatus 1 returns to Act 1.

Accordingly, in the plurality of sheets of the erasing process target accommodated in the sheet feeding cassette designated by the user, when the automatic erasing process is being performed and when the operation panel 4 receives the process request in Act 1, the control unit 7 stops the automatic erasing process, and causes the image forming apparatus 1 to perform the process corresponding to the process request.

In Act 1, when the operation panel 4 receives the normal erasing process based on the manual instruction (YES in Act 1), the erasing process is performed according to the designation of the sheet feeding source and the sheet discharge destination received in advance, on the setting screen 71 (Act 8). When the request of the erasing process is received, the control unit 7 displays the setting screen on the display unit 41 again, and may receive the designation of the sheet feeding source and the sheet discharge destination.

As described above, in the embodiment, the user accommodates the sheet to be subjected to the erasing process in the sheet feeding cassettes 21 to 24 desired in advance by the user, designates the sheet feeding cassettes 21 to 24 as the sheet feeding source, and designates the desired sheet discharge destination, and thus the image forming apparatus 1 can automatically complete the erasing process of the sheet without the instruction of the user at the time of the resting state. Accordingly, the image forming apparatus 1 according to the embodiment can efficiently perform the erasing process as compared with the image forming apparatus configured to perform the erasing process based on the instruction from the user after another process such as a printing process is completed.

As described above, when the resting state, in other words, the state of waiting for the process request from the user continues during the predetermined time, the image forming apparatus according to the embodiment performs the automatic erasing process of transporting the sheet of the erasing process target from the sheet feeding cassette designated by the user to the fixing unit serving as the erasing unit, erasing the image of the sheet of the erasing process target, and discharging the sheet after erasing the image to the sheet discharge tray designated by the user, according to the control of the control unit 7.

In the embodiment, the fixing unit also serves as the erasing unit that erases the image of the sheet, but the erasing unit may be configured separately from the fixing unit.

In the embodiment, the erasing unit is configured to erase the toner image by heating the sheet, using the decoloring toner which is decolored by heat as the erasable toner. However, the erasing unit may be configured to degrade the toner image by irradiating the sheet with light such as near-infrared light, using a photodegradable toner which is degraded by irradiation of light such as near-infrared light as the erasable toner. In addition, the erasing unit may be configured to peel off the toner image from the sheet by immersing the sheet in a treatment liquid, using a material peeled off from the sheet by being immersed in a treatment liquid as the erasable toner. The transfer belt 54 may not be provided, and may be configured to directly transfer the toner image from the photoreceptor 53 onto the sheet. In this case, the photoreceptor 53 is the image bearing body. The process sequence in each of the above embodiments may be different from the sequence exemplified in the previous embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus which forms an image on a recording medium, comprising:

an image forming unit that forms an image on a recording medium;

an erasing unit configured to erase the image formed on the recording medium;

an operation panel configured to receive a process request including an image forming process performed by the image forming unit and an erasing process performed by the erasing unit;

a control unit configured to control the units to perform a process corresponding to the process request received by the operation panel, and control the erasing unit to perform the erasing process when a state where the operation panel does not receive the process request continues during a predetermined time or more;

a fixing unit comprising a heating element configured to heat a sheet at a fixed temperature to fix a toner image to the sheet when an image forming process is performed and to heat the sheet at an erasing temperature higher than a fixing temperature to erase the toner image of the sheet when an erasing process is performed, and wherein the fixing unit operates as the erasing unit; and a plurality of cassettes that accommodate a recording medium of an image forming process target and an erasing process target, wherein the operation panel receives designation of a cassette that accommodates the recording medium of the erasing process target in the plurality of cassettes.

2. The image forming apparatus according to claim 1, further comprising a plurality of trays that discharge the recording medium subjected to the image forming process and the erasing process, wherein the operation panel receives designation of a tray that discharges the recording medium subjected to the erasing process in the plurality of trays.

3. The image forming apparatus according to claim 2, wherein the operation panel includes a display unit that displays a setting screen receiving the designation of the cassette and the designation of the tray.

4. The image forming apparatus according to claim 3, wherein the setting screen receives the designation of the cassette and the tray by associating the cassette with the tray.

5. The image forming apparatus according to claim 1, further comprising a sensor that detects whether there is a recording medium in the designated cassette when a state where the operation panel does not receive the process request continues during a predetermined time or more, wherein the control unit controls the erasing unit to perform the erasing process when there is the recording medium in the designated cassette as a detection result of the sensor.

6. The image forming apparatus according to claim 5, wherein the control unit controls the erasing unit to perform the erasing process for all the sheets accommodated in the designated cassette based on the detection result of the sensor.

7. The image forming apparatus according to claim 6, wherein the control unit has a normal power mode of controlling power supply to the image forming unit and the erasing unit and a power saving mode of further reducing power supply to the image forming unit or the erasing unit than the normal power mode, as a power control mode, and the control unit transfers the power control mode from the normal power mode to the power saving mode when there is no recording medium in the designated cassette as the detection result of the sensor.

8. The image forming apparatus according to claim 7, the control unit transfers the power control mode to the power saving mode after the recording medium is removed from the designated cassette by the erasing process when there is the recording medium in the designated cassette as the detection result of the sensor.

9. The image forming apparatus according to claim 6, wherein when the operation panel receives the process request while the erasing unit performs the erasing process on the sheet accommodated in the designated cassette, the control unit stops performing of the erasing process and controls performing of a process corresponding to the request received by the operation panel.

* * * * *